(12) United States Patent
Watchorn

(10) Patent No.: US 9,788,525 B1
(45) Date of Patent: Oct. 17, 2017

(54) GROOMING APPARATUS FOR HOUSEHOLD PETS

(71) Applicant: Gary L. Watchorn, Moore, SC (US)

(72) Inventor: Gary L. Watchorn, Moore, SC (US)

( * ) Notice: Subject to any disclaimer, the term of this patent is extended or adjusted under 35 U.S.C. 154(b) by 0 days.

(21) Appl. No.: 13/687,271

(22) Filed: Nov. 28, 2012

(51) Int. Cl.
*A01K 1/03* (2006.01)
*A01K 13/00* (2006.01)
*A01K 1/035* (2006.01)

(52) U.S. Cl.
CPC .............. *A01K 13/00* (2013.01); *A01K 1/033* (2013.01); *A01K 1/035* (2013.01); *A01K 1/0356* (2013.01); *A01K 13/004* (2013.01)

(58) Field of Classification Search
CPC .......... E06B 7/32; A01K 1/035; A01K 1/033; A01K 1/0017; A01K 1/0356; A01K 13/00; A01K 13/004
USPC ....... 119/618, 620, 600, 161, 165, 482, 496, 119/498, 501
See application file for complete search history.

(56) References Cited

U.S. PATENT DOCUMENTS

| | | | |
|---|---|---|---|
| 1,568,226 A | 1/1926 | Larson | |
| 1,582,144 A | 4/1926 | Pflaum | |
| 2,832,406 A | 4/1958 | Turenne | |
| 2,865,329 A | 12/1958 | Elliott | |
| 2,882,964 A * | 4/1959 | Watkin | 160/330 |
| 2,976,841 A | 3/1961 | Scheffer | |
| 4,301,766 A | 11/1981 | Piccone | |
| 4,349,982 A * | 9/1982 | Sherman | 43/131 |
| 4,350,198 A * | 9/1982 | Naegeli | 160/179 |
| 4,938,169 A | 7/1990 | Barmakian | |
| 5,133,291 A * | 7/1992 | Justice | 119/51.01 |
| 5,351,646 A | 10/1994 | Zoroufy | |
| 5,363,804 A | 11/1994 | McAlister | |
| 5,458,088 A | 10/1995 | Owens | |
| 5,579,720 A | 12/1996 | Udelle et al. | |
| 5,782,206 A | 7/1998 | Markowitz | |
| 5,842,438 A | 12/1998 | Messmer | |
| 5,964,189 A * | 10/1999 | Northrop et al. | 119/482 |
| 6,338,315 B1 | 1/2002 | Stillman | |
| 6,698,384 B2 | 3/2004 | Markowitz | |
| 7,011,046 B1 | 3/2006 | Kidwell | |
| 7,444,959 B2 | 11/2008 | Hensley | |
| 8,601,982 B2 * | 12/2013 | Shimizu | 119/479 |
| 2002/0139313 A1* | 10/2002 | Mack et al. | 119/165 |
| 2008/0053379 A1* | 3/2008 | Markewitz | 119/600 |
| 2012/0137984 A1 | 6/2012 | Haaf | |
| 2014/0053863 A1* | 2/2014 | Chudzik | A45D 8/00 132/273 |

OTHER PUBLICATIONS

"Standard Test Methods for Loop Tack." D 6195-03. pp. 1-5. ASTM International. West Conshohocken, PA, United States.

* cited by examiner

*Primary Examiner* — Son T Nguyen
(74) *Attorney, Agent, or Firm* — Juneau & Mitchell; Todd Juneau

(57) ABSTRACT

A grooming apparatus for a household pet is provided having a wall with an opening for admitting the pet into an enclosure, whereby a flexible, resilient sheet positioned in the opening is deflected by the pet and a pressure sensitive adhesive on the surface of the sheet attracts and retains loose pet hair.

19 Claims, 4 Drawing Sheets

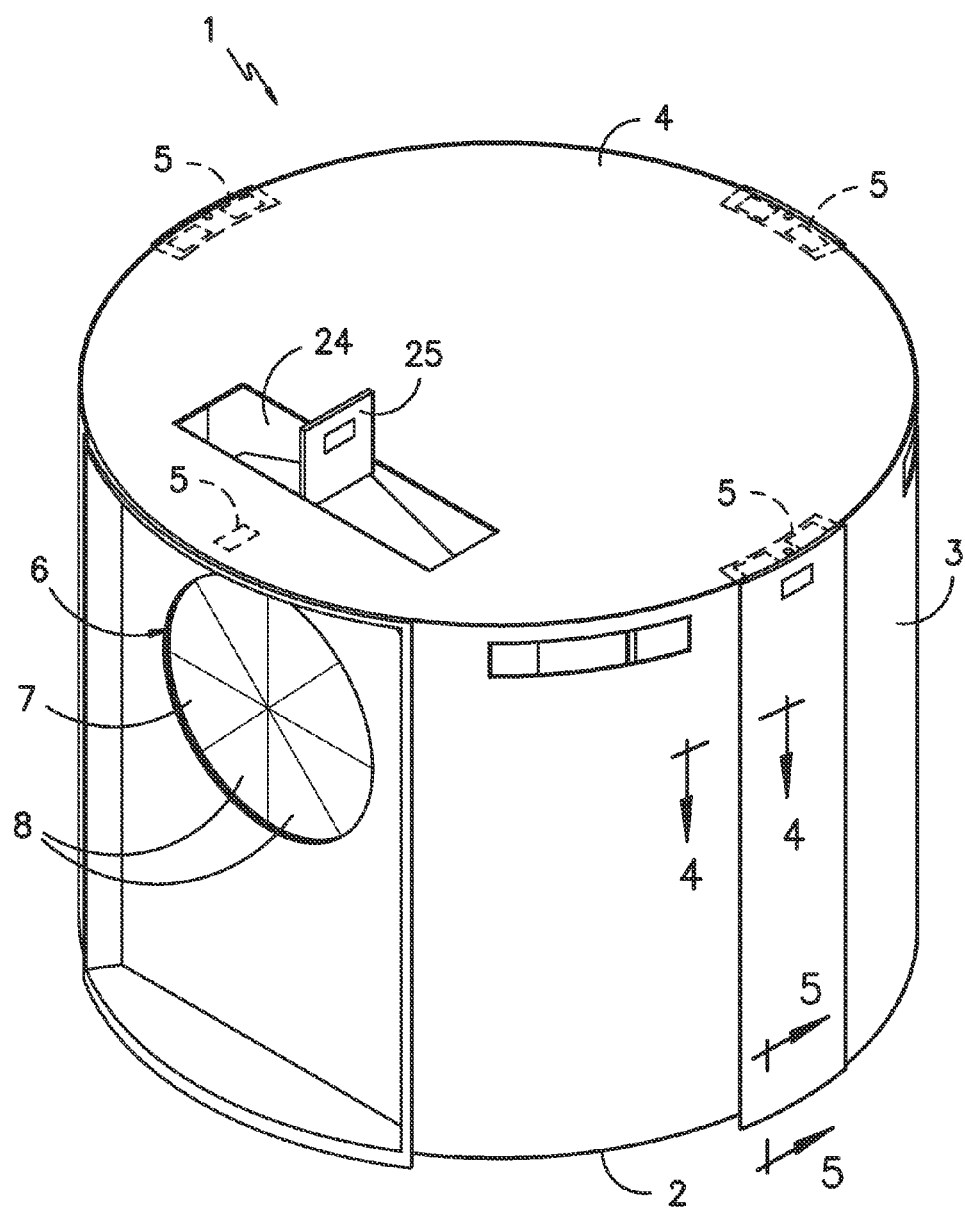
FIG. -1-

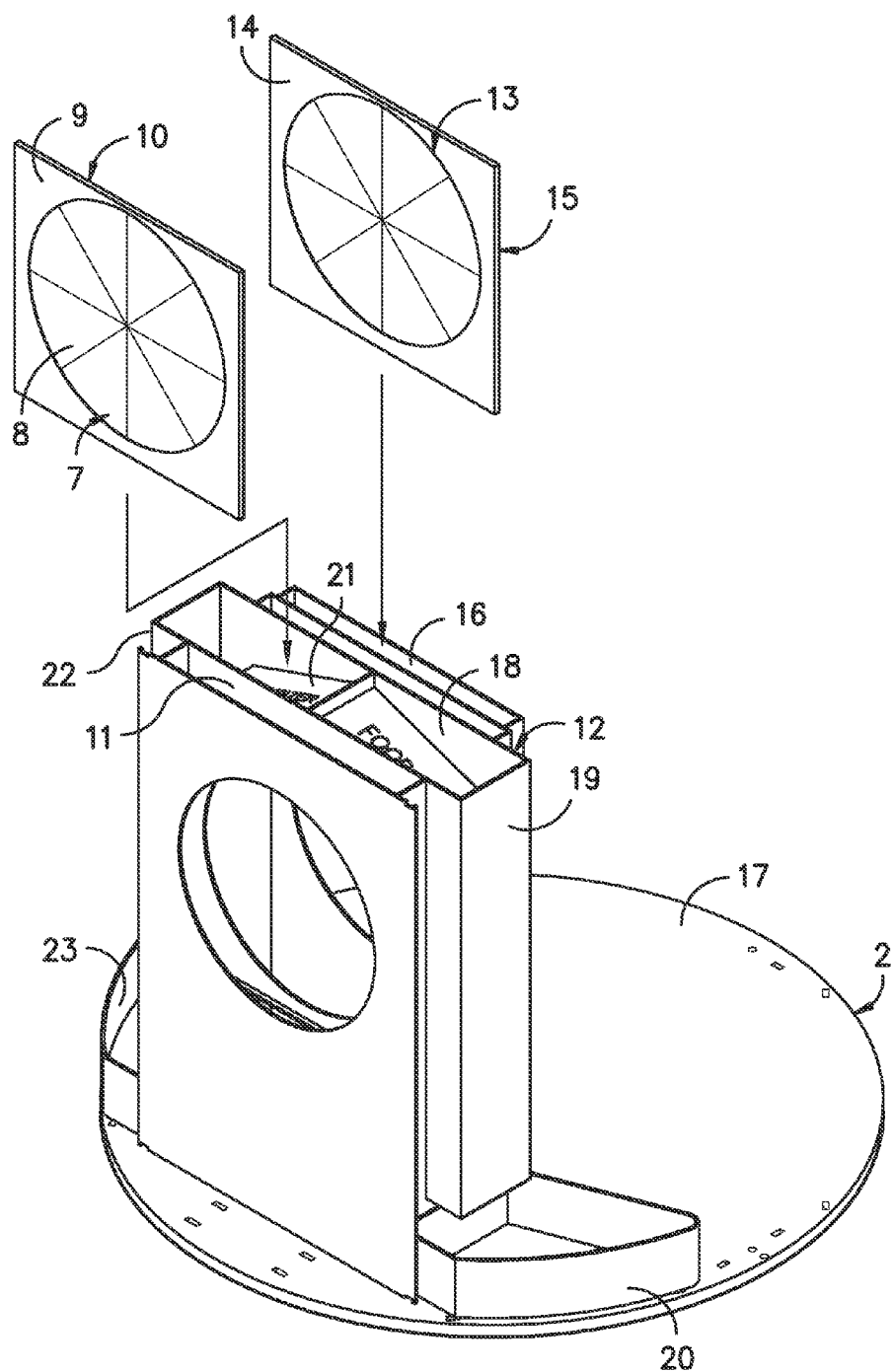
FIG. -2-

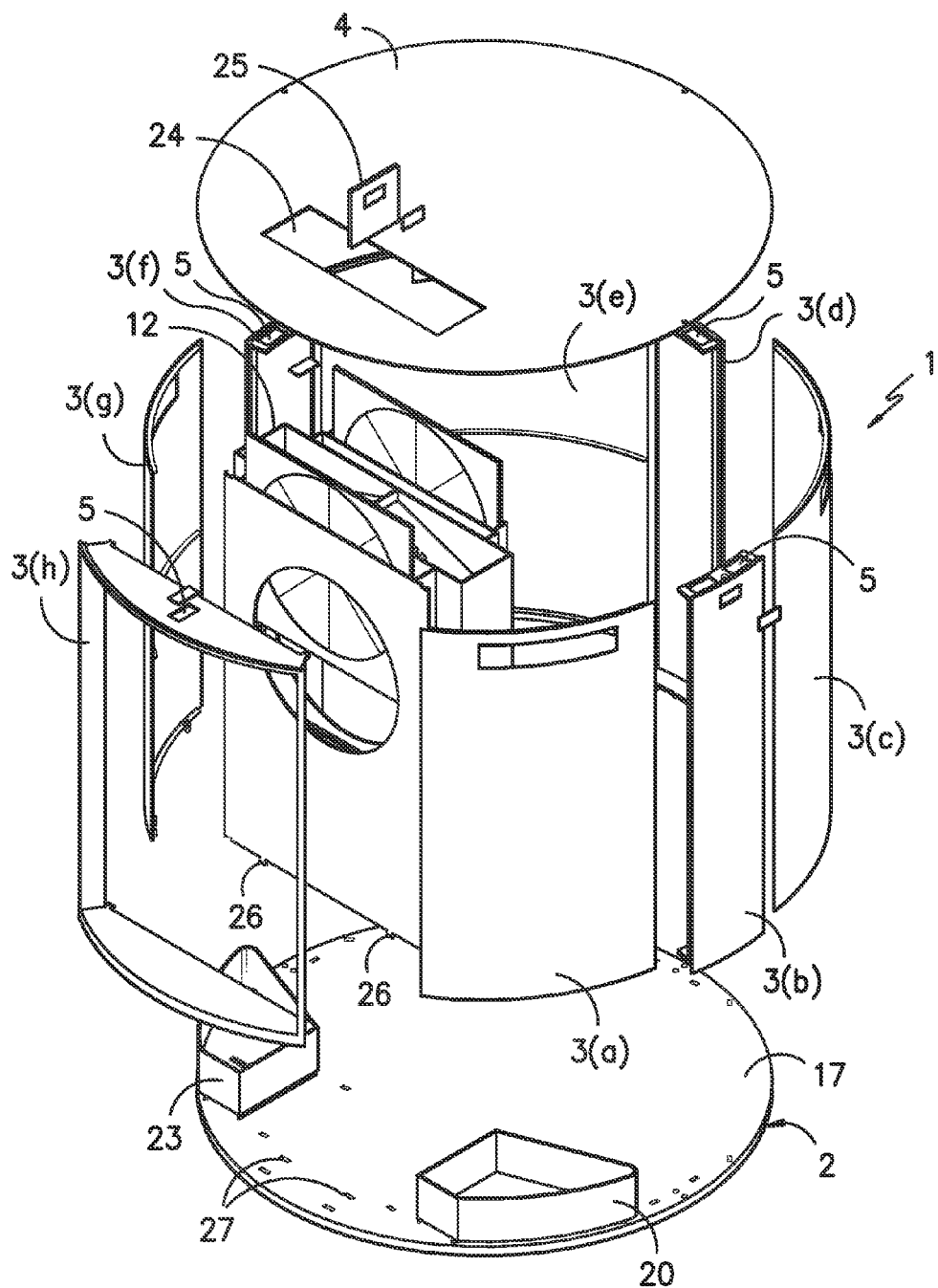
FIG. —3—

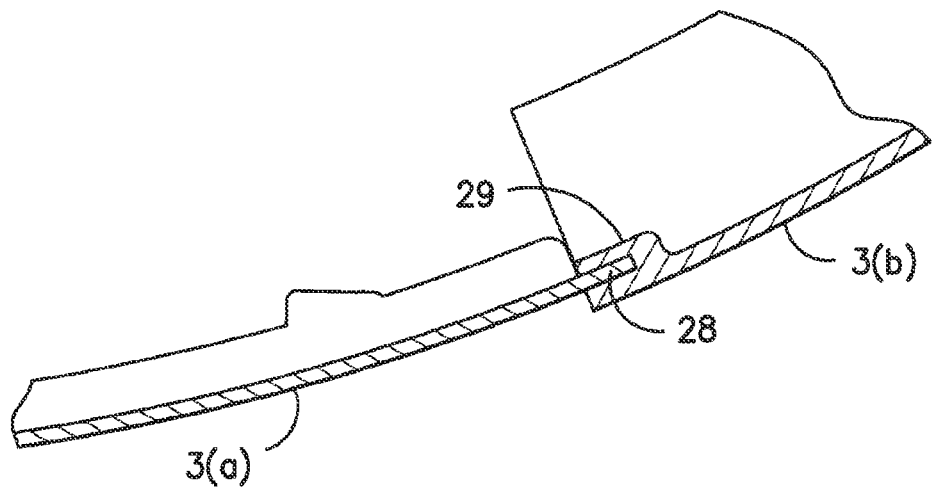
FIG. -4-
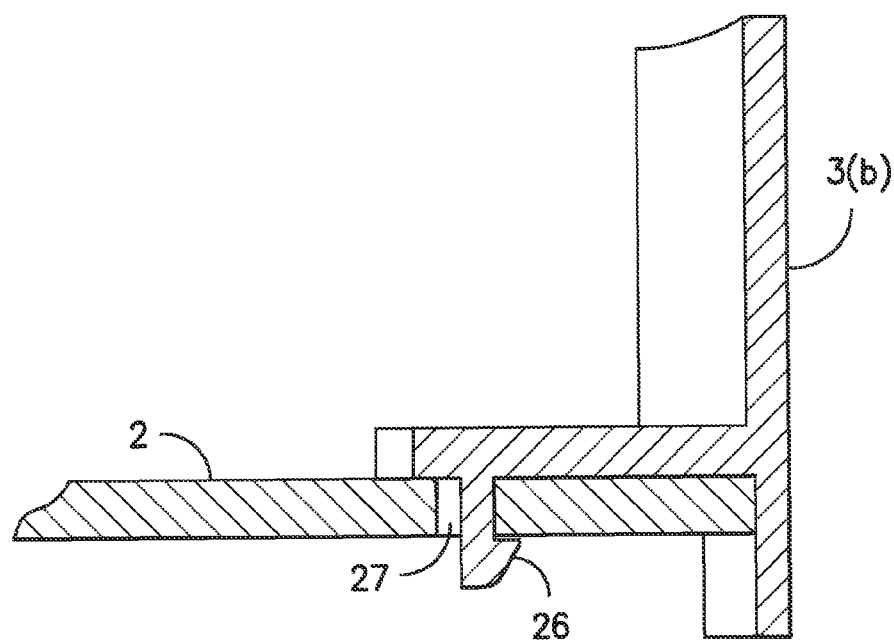
FIG. -5-

GROOMING APPARATUS FOR HOUSEHOLD PETS

This invention is directed to a device for grooming household pets and collecting pet hair, in which the grooming device is positioned in the opening of an enclosure.

BACKGROUND OF THE INVENTION

Household pets, such as cats and dogs, regularly shed their hair. Pets that spend a significant period of time outdoors typically shed in the spring and fall, whereas indoor pets can shed all year round. Pet hair can accumulate on rugs, carpets, furniture, clothing, and hard surfaces. The problem increases when the owner has multiple pets in the home. Additionally, excess hair can cause hairballs, especially in cats, when the pet grooms itself and swallows hair.

Various devices have been disclosed for automatically grooming a pet and collecting shed hair, when the pet passes through a portal. Barmakian, U.S. Pat. No. 4,938,169 discloses the use of one or two panels covered with grooming bristles, placed in an opening in a wall or door, which groom the pet as it traverses the opening. Markowitz, U.S. Pat. No. 5,842,206 discloses a litter box having bristles surrounding the opening, to groom the coat of a pet. Messmer, U.S. Pat. No. 5,842,438 disclosed a feline litter box, which contains a grooming disk in the portal. The surface of the grooming disk is covered with raised ribs to remove and collect hair. Markowitz, U.S. Pat. No. 6,698,384 B2 discloses a feeding and litter box apparatus that contains an adjustable grooming brush assembly mounted in the portal.

An enclosure may be provided for a pet having an interior portion lined with a material to attract and collect pet hair. Zoroufy, U.S. Pat. No. 5,351,646 discloses a cylindrical device lined with a material having raised rubberized protuberances. Udelle et al., U.S. Pat. No. 5,579,720 disclose an enclosure for pets lined with a sheet of plastic or carpeting or other suitable material having bristles to remove and collect loose pet hair. Haaf, US Patent Application 2012/0137984 A1 discloses a grooming tunnel, which may be lined with unwoven polyester fibers or directional microfibers capable of providing a grooming action on a pet traversing the tunnel.

Despite the proliferation of pet grooming devices, shortcomings remain. Grooming assemblies employing wire, plastic or rubberized bristles can be expensive to manufacture. Furthermore, devices that rely on stiff bristles to remove pet hair can irritate a pet's skin. Pet hair that collects on the grooming assemblies can transfer back to the pet, for example, as a result of static electrical charges or wet fur. Additionally, the grooming devices must be manually cleaned on a regular basis. Even with regular cleaning, devices employing a fibrous substrate, such as carpeting, may harbor flea eggs, mites and the like.

Thus, a need persists for a pet grooming device that is economical to manufacture, removes and retains loose pet hair, without being unpleasant for the pet, and incorporates a disposable grooming disc that can be periodically replaced.

SUMMARY OF THE INVENTION

The subject invention substantially overcomes the aforementioned objectives and fills the previously unmet needs. Accordingly, a grooming apparatus for household pets is provided having and an opening in the enclosure, which is positioned to be accessible to the pet and proportioned to allow the pet to pass back and forth through the enclosure. The enclosure may be a house, garage, room or stand-alone pen or container having a floor, wall(s) and lid. The opening is positioned within a wall of the enclosure. The term "wall" is intended to include a door for humans, as well as a fixed wall, and the wall need not be vertical, for example, the wall may be aligned from 0° to 60° relative to horizontal. The side of a cylindrical enclosure is also intended to be included within the term "wall" or "walls."

A flexible sheet is positioned in the opening and is deflectable from a first position, wherein the sheet obstructs access in and out of the enclosure, through the opening, to a second position, wherein the sheet is deflected in the direction of the movement of the pet through the opening. The sheet is sufficiently resilient so that as the pet passes through the opening, the deflected sheet presses against the torso of the pet. The surface of the sheet that is contactable with the torso of the pet as it passes through the opening has a pressure sensitive adhesive applied to the surface. A pressure sensitive adhesive is an adhesive that forms a bond when pressure is applied, thereby marrying the surface of the sheet to which the adhesive has been applied with the loose fur of the pet. No solvent, water, or heat is needed to activate the adhesive. The pressure sensitive adhesive provides the tack necessary to remove and retain loose pet hair, without impeding the movement of the pet, and without causing discomfort to the pet, such as by tearing out hair which is not ready to be shed.

It can be understood that the proportions of the opening in the enclosure and the sheet will depend on the size of the pet being groomed. For example, the grooming apparatus may be conveniently provided in small, medium and large sizes for various breeds of dogs. In the case of cats, the opening, sheet and enclosure may be proportioned to accommodate an average sized housecat, which unless otherwise indicated has a weight of 10 lbs., a height of 10 inches and a length (excluding the tail) of 18 inches.

In a preferred embodiment, there is provided a grooming apparatus for a household pet, comprising: (a) an enclosure having one or more walls and an opening in the one or more walls, wherein the opening is positioned in the one or more walls to be accessible to the pet and proportioned to allow the pet to pass back and forth from outside to inside the enclosure; and (b) a first replaceable groomer cartridge having a first peripheral frame positioned in a first cartridge receiver in a first position, and the first replaceable groomer cartridge having a first grooming sheet disposed within the first peripheral frame and extending partially across the opening; (c) a second replaceable groomer cartridge having a second peripheral frame positioned in a second cartridge receiver in a second position, and the second replaceable groomer cartridge having a second grooming sheet disposed within the second peripheral frame and extending partially across the opening; wherein the first grooming sheet and the second grooming sheet are spaced from 2"-8" apart; whereby the first grooming sheet and the second grooming sheet are each deflectable by the pet from a first deflectable position obstructing access through the opening to a second deflectable position deflected in the direction of movement of the pet through the opening, wherein the first grooming sheet and the second grooming sheet are each sufficiently resilient to press against a torso of the pet in the second position while the pet passes through the opening, and wherein the first grooming sheet and the second grooming sheet are each a textile material constructed from a plurality of fibers and each having a surface with a pressure sensitive adhesive applied thereto and contactable with the pet; (d) a transparent lid operatively associated with the enclosure; and (e) a floor of the enclosure connected to the one or more walls, said enclosure having a food supply apparatus and a water supply apparatus, said food supply apparatus having a food supply port in operative association with a food container accessible by the pet, said water supply apparatus having a water supply port in operative association with a water container accessible by the pet.

In another preferred embodiment, there is provided a grooming apparatus, wherein the first grooming sheet and the second grooming sheet are a nonwoven material comprising fibers, selected from the group consisting of natural and synthetic, polymeric textile fibers.

In another preferred embodiment, there is provided a grooming apparatus, wherein the first grooming sheet and the second grooming sheet comprise fibers selected from the group consisting of polyamide, polyester, polyolefin and acrylic polymer fibers.

In another preferred embodiment, there is provided a grooming apparatus, wherein a sizing agent is applied to the first grooming sheet and the second grooming sheet and the sizing agent increases stiffness of the first grooming sheet and the second grooming sheet.

In another preferred embodiment, there is provided a grooming apparatus, wherein the surfaces of the first grooming sheet and the second grooming sheet to which the pressure sensitive adhesive has been applied has a loop tack force of from 5 to 60 grams per 25 mm×25 mm of surface area, as measured by ASTM D 6195-03.

In another preferred embodiment, there is provided a grooming apparatus, wherein the pressure sensitive adhesive is selected from the group consisting of acrylic acid and acrylic ester polymers and copolymers.

In another preferred embodiment, there is provided a grooming apparatus for a household pet, comprising: (a) an enclosure having a floor, a transparent lid and a wall, with an opening in the wall, wherein the opening is positioned in the wall to be accessible to the pet and proportioned to allow the pet to pass back and forth from outside to inside the enclosure; and (b) a first replaceable groomer cartridge having a first peripheral frame positioned in a first cartridge receiver in a first position and the first replaceable groomer cartridge having an adhesive sheet disposed within the first peripheral frame and extending partially across the opening; (c) a second replaceable groomer cartridge having a second peripheral frame positioned in a second cartridge receiver in a second position, and the second replaceable groomer cartridge having a grooming sheet disposed within the second peripheral frame and extending partially across the opening, whereby the adhesive sheet and the grooming sheet are planar, are spaced from 4"-6" apart, and are each deflectable by the pet from a first deflectable position obstructing access through the opening to a second deflectable position deflected in the direction of movement of the pet through the opening, wherein the adhesive sheet and the grooming sheet are each sufficiently resilient to press against a torso of the pet in the second position while the pet passes through the opening, and wherein the adhesive sheet and the grooming sheet are each a textile material constructed from a plurality of fibers and each having a surface with a pressure sensitive adhesive applied thereto and contactable with the pet; and, (d) the enclosure having a food supply apparatus and a water supply apparatus. said food supply apparatus having a food supply port in operative association with a food container accessible by the pet, said water supply apparatus having a water supply port in operative association with a water container accessible by the pet.

In another preferred embodiment, there is provided a grooming apparatus, wherein the adhesive sheet and the grooming sheet are comprised of a plurality of triangular shaped flaps, with an apex of each flap oriented towards a center of the sheet.

In another preferred embodiment, there is provided a grooming apparatus, wherein the food supply port and the water supply port are located in the lid. and the food supply port and the water supply port are connected to a chute for directing food or water to the food or water container accessible by the pet inside the enclosure.

In another preferred embodiment, there is provided a grooming apparatus, wherein the surfaces of the adhesive sheet and the grooming sheet to which the pressure sensitive adhesive has been applied has a loop tack force of from 10 to 40 grams per 25 mm×25 mm of surface area, as measured by ASTM D 6195-03.

In another preferred embodiment, there is provided a grooming apparatus, wherein the pressure sensitive adhesive is applied to two sides of the adhesive sheet.

In another preferred embodiment, there is provided a grooming apparatus, further com- prising a second adhesive sheet positioned in the opening, whereby the second adhesive sheet is deflectable by the pet from a third deflectable position obstructing access through the opening to a fourth deflectable position deflected in the direction of movement of the pet through the opening, wherein the second adhesive sheet is sufficiently resilient to press against a torso of the pet in the fourth position while the pet passes through the opening, and wherein another pressure sensitive adhesive is applied to two sides of the second adhesive sheet, and wherein the adhesive sheet and the second adhesive sheet are spaced apart at a distance of from 3 to 6 inches.

In another preferred embodiment, there is provided a grooming apparatus, wherein the one or more walls is a single wall and the enclosure is shaped like a tower.

In another preferred embodiment, there is provided a grooming apparatus, further comprising a second opening.

In another preferred embodiment, there is provided a grooming apparatus, wherein the one or more walls comprises at least three interlocking walls.

In another preferred embodiment, there is provided a grooming apparatus, wherein the food container and the water container are removeably attached to the floor of the enclosure.

In another preferred embodiment, there is provided a grooming apparatus, further comprising wherein the enclosure, the floor, the first replaceable groomer cartridge and the second replaceable groomer cartridge, the food supply apparatus, and the water supply apparatus all have snap-fit connectors, wherein the grooming apparatus is assembled without tools.

In another preferred embodiment, there is provided a grooming apparatus, wherein the grooming cartridges are treated with a composition for repelling or killing fleas, ticks, lice and mites.

In another preferred embodiment, there is provided a grooming apparatus, the composition for repelling or killing fleas, ticks, lice and mites is selected from the group consisting of oil of eucalyptus, lavender, rosemary, rose geranium, citronella, organophosphates, carbamates, pyrethrins, flea collar pesticide, and flea collar insecticide.

BRIEF DESCRIPTION OF THE DRAWINGS

FIG. 1 is a perspective view of the outside of the enclosure.

FIG. 2 is a perspective view of the groomer tower, food and water containers and floor of the enclosure, with the groomer cartridges removed.

FIG. 3 is an exploded view of the grooming apparatus.

FIG. 4 is a cross-sectional view of interlocking sections of the wall forming the enclosure, taken along line 4-4 of FIG. 1.

FIG. 5 is a cross-sectional view of interlocking portions of the wall and floor forming the enclosure, taken along line 5-5 of FIG. 1.

DETAILED DESCRIPTION OF THE INVENTION

Without intending to limit the scope of the invention, the preferred embodiments and features are hereinafter set forth. All United States patents cited in the specification are incorporated herein by reference. Unless otherwise indicated, conditions are 25° C., 1 atmosphere of pressure and 50% relative humidity, concentrations are by weight, molecular weight is based on weight average molecular weight and aliphatic hydrocarbons and radicals thereof are from one to four carbon atoms in length.

Referring to FIG. 1, a stand-alone enclosure incorporating the grooming apparatus of the present invention is shown. Enclosure 1 is a cylindrical container having floor 2, side wall 3 and lid 4. Corresponding hook and loop fasteners 5 are spaced around the upper edge of wall 3 and lid 4, to allow access to the interior of enclosure 1 by a pet owner. An opening 6 is provided in wall 3 and sized to be accessible by a pet and is the sole means for a pet to enter the interior of enclosure 1. While enclosure 1 is illustrated as having a cylindrical shape, the enclosure may be a rectangular prism, triangular prism, pyramid or cone. Alternatively, the enclosure may be a house, garage, room, pen or other space that cannot be accessed by the pet, without passing though the opening provided in one of the walls forming the enclosure.

Referring to FIG. 2, sheet 7 is a flexible, resilient, planar structure positioned in opening 6. In an undeflected position, sheet 7 obstructs opening 6, that is, the pet must deflect sheet 7 to gain access to the interior of enclosure 1. Sheet 7 may be formed of individual elements held together to create a planar structure, or, as in the example illustrated, sheet 7 may be cut from flat stock to create a plurality of flaps 8. The flaps may be triangular shaped, with the apex aligned towards the center of opening 6 and the base aligned around the periphery of opening 6. By way of example, sheet 7 may be made up of from 4 to 12 triangular shaped flaps.

Sheet 7 may be solid. For example, sheet 7 may be constructed from flat stock formed from a thermoplastic or thermoset polymer, such as by extrusion, molding, or other manufacturing techniques known to those skilled in the art. Alternatively, sheet 7 may be constructed from a textile material, wherein fibers and/or yarns may be formed into a woven, knitted or nonwoven planar structure, such as a fabric or felt. Examples of suitable materials of construction include natural fibers, such as cotton, wool and silk, synthetic fibers, such as polyamide, polyester, polyolefin and acrylic fibers, and combinations thereof. The fibers may be staple or filaments, and the yarns may be spun from staple fibers, or consist of monofilament or multifilament fibers. Stiffening agents, such as starches, may be applied to the sheet material, especially textile sheets, to obtain the desired stiffness and resilience.

By way of example, sheet 7 may be a nonwoven fabric or felt, which may be made by needle punching staple fibers or in situ extrusion of a thermoplastic fiber. The nonwoven fabric may incorporate low melt temperature and high melt temperature fibers that can be fused together by heating the material. The fibers may be sheath and core fibers, with a low melt temperature thermoplastic sheath. The nonwoven material may incorporate binders to maintain the shape and integrity of the sheet.

In one embodiment of the invention, flaps are cut in a nonwoven textile sheet made from a mixture of 50% polyester and 50% acrylic fibers, which has been treated with starch to increase stiffness.

The thickness of sheet 7 will depend upon the nature of the material of construction and is selected to achieve the desired deflection to allow the pet to enter the enclosure and resilience to press against the pet's torso as it passes through the opening and return to its position obstructing the opening to the enclosure. By way of example, the thickness of sheet 7 may range from 0.04" (40 mil) to 0.08" (80 mil), in particular, from 0.06" (60 mil) to 0.07" (70 mil).

Sheet 7 has a surface application of a pressure sensitive adhesive to create sufficient tack, to remove and retain pet hair. Preferably, the pressure sensitive does not transfer or leave a residue on the pet's fur. By way of example, the adhesive may be applied to sheet 7 by surface spraying, immersion, kiss roll, extrusion coating, or film lamination. The adhesive may be dried or cured to achieve the desired tack characteristics. Suitable adhesives include those made from polymers of acrylic acid and/or acrylic acid alkyl esters, butyl rubber, ethylene-vinyl acetate, natural rubbers, nitriles, such as nitrile butadiene rubber, silicone rubber and styrene block copolymers.

The pressure sensitive adhesive may be applied to one or both sides of sheet 7. Preferably, the pressure sensitive adhesive is applied to both sides of the sheet, so that the pet rubs against sheet 7 upon entering and leaving enclosure 1.

In one embodiment of the invention, the sheet having the pressure sensitive adhesive applied thereto has a tack force ranging from 5 to 60 grams per 25 mm×25 mm of surface area, in particular from 10 to 40 grams per 25 mm×25 mm of surface area, as measured by ASTM D 6195-03 Standard Test Methods for Loop Tack, Test Method B—Loop Tack Tester and based on a numerical average of three measurements.

Referring to FIG. 2, sheet 7 is supported by frame 9, which together form cartridge 10. Cartridge 10 slides into receiver 11, positioned at the front of groomer tower 12, so that sheet 7 is centered in opening 6. The grooming apparatus of the present invention may include a second sheet 13 supported by frame 14, which together form cartridge 15. Cartridge 15 slides into receiver 16 positioned in the rear of groomer tower 12, so that sheet 13 is centered in opening 6. A pet entering or leaving enclosure 1 must pass both sheet 7 and sheet 13. The distance between sheet 7 and sheet 13 is selected to allow sufficient room for the sheets to be deflected without interfering with each other and to maximize the contact between the torso of the pet and the sheet. By way of example, for a domestic cat, the two sheets may be spaced a distance of from 2 inches to 8 inches apart, in particular, from 3 to 6 inches apart, more particularly from 4 to 5 inches apart.

Cartridges 10 and 15 may be manufactured inexpensively, relative to prior art grooming devices having bristles and molded protuberances for collecting pet hair. Accordingly, when the cartridges of the present invention become covered with pet hair, they can be disposed of, and replacement cartridges can be inserted in the receivers in groomer tower 12. Another advantage of the cartridges of the present invention is that any external parasites, such as fleas, ticks, lice and mites, that may collect on the cartridges are removed and do not reestablish themselves on the pet, when the cartridge is disposed of.

In one embodiment of the invention, the sheets forming the grooming cartridges are treated with a natural or synthetic composition capable or repelling or killing one or more of fleas, ticks, lice and mites. The composition can affect parasites collected on the sheet, or when traces of the composition transfer to the pet's fur, repel and kill parasites on the pet itself. Examples of suitable compositions include oil of eucalyptus, lavender, rosemary, rose geranium and citronella, organophosphates, carbamates, pyrethrins, and other pesticides and insecticides, such as are used on flea collars, known to those skilled in the art.

Groomer tower 12 incorporates a means to direct food and water from the upper portion of enclosure 1 to receptacles positioned on the upper surface 17 of floor 2. Food supply port 18 located in the top of groomer tower 12 and directs food down chute 19 to food dish 20. Water supply port 21 located in the top of groomer tower 12, on the opposite side from food supply port 18, and directs water down chute 22 to water dish 23. Referring to FIG. 3, slot 24 in lid 4 allows access to food supply port 18 and water supply port 21, without having to lift lid 4. Separator 25 between food supply port 18 and water supply port 21 directs food and water into the appropriate dish.

Referring to FIG. 3, dishes 20 and 23 may be secured to floor 2 by corresponding interlocking components, such as hook-and-loop fasteners, e.g. Velcro® attached to the respective parts. Groomer tower 12 may be secured to floor 2 by interlocking components such as tabs 26 extending from the bottom of groomer tower 12 that engage slots 27 in floor 2.

Wall 3 of enclosure 1 may be constructed from multiple interlocking sections. Accordingly, wall sections 3(*a*), 3(*b*), 3(*c*), 3(*d*), 3(*e*), 3(*f*), and 3(*g*) may interlock with each other and door frame 3(*h*) to form wall 3. Wall sections 3(*a*)-(*h*) can be provided with tabs to engage slots in floor 2, to form enclosure 1. In the embodiment of the invention shown in FIG. 3, wall sections 3(*b*), 3(*d*) and 3(*f*) are inserted first into floor 2, and wall sections 3(*a*), 3(*c*), 3(*e*) and 3(*g*) are slid down the adjacent wall section and inserted into floor 2. Referring to FIG. 4, ridge 28 along the side edge of wall section 3(*a*) is inserted into groove 29 in wall section 3(*b*).

The parts that make up the floor, walls, groomer tower, door frame, dishes and lid of the grooming apparatus may be formed from thermoplastic resin, such as by injection molding or other manufacturing process known to those skilled in the art. By way of example, the floor, walls, groomer tower, door frame, and dishes may be polypropylene or acrylonitrile butadiene styrene (ABS), whereas the lid may be a transparent material, such as polycarbonate or acrylic resin, including polymethyl methacrylate.

The grooming apparatus may be sold unassembled, with the parts being provided loose in a flat box. The interlocking components can be designed to create a snap-fit connection, and the apparatus can be assembled without tools.

In an alternative embodiment of the invention, a litter box may be placed on floor 2, instead of or in addition to the food and water dishes. As with the food and water dishes, the litter box incentivizes the pet to regularly enter the enclosure, at which time the pet is groomed and loose hair is collected on sheets 7 and 13.

Examples

A nonwoven textile sheet was made from a mixture of 50% polyester staple fibers and 50% acrylic staple fibers, by weight, was formed by needle punching. The sheet had a thickness of 0.060 inches (60 mils). The sheet was treated with starch and dried to increase stiffness. The sheet was lightly coated with a 100% acrylic based, pressure sensitive adhesive. Side 1 and side 2 of the sheet were provided with an add-on of adhesive (solids) of approximately 3 oz per square yard and 1.5 oz per square yard of sheet, respectively. The sheet was cut into 3 inch by 3 inch squares and submitted for testing.

Loop Tack

The sheet was tested according to ASTM D 6195-03 Standard Test Methods for Loop Tack. The results are summarized below, based on a numerical average of three tests on each side:

| Loop Tack | Side 1: 47.8 g per 25 × 25 mm of surface area | Side 2: 29.5 g per 25 × 25 mm of surface area |
|---|---|---|

The invention may be further understood by reference to the following claims.

What I claim is:

1. A grooming apparatus for a household pet, comprising:
   (a) an enclosure having one or more walls and an opening in the one or more walls, wherein the opening is positioned in the one or more walls to be accessible to the pet and proportioned to allow the pet to pass back and forth from outside to inside the enclosure; and
   (b) a first replaceable groomer cartridge having a first peripheral frame positioned in a first cartridge receiver in a first position; and the first replaceable groomer cartridge having a first grooming sheet disposed within the first peripheral frame and extending partially across the opening;
   (c) a second replaceable groomer cartridge having a second peripheral frame positioned in a second cartridge receiver in a second position, and the second replaceable groomer cartridge having a second grooming sheet disposed within the second peripheral frame and extending partially across the opening;
   wherein the first grooming sheet and the second grooming sheet are spaced from 2"-8" apart;
   whereby the first grooming sheet and the second grooming sheet are each deflectable by the pet from a first deflectable position obstructing access through the opening to a second deflectable position deflected in the direction of movement of the pet through the opening, wherein the first grooming sheet and the second grooming sheet are each sufficiently resilient to press against a torso of the pet in the second position while the pet passes through the opening, and wherein the first grooming sheet and the second grooming sheet are each a textile material constructed from a plurality of fibers and each having a surface with a pressure sensitive adhesive applied thereto and contactable with the pet;
   (d) a transparent lid operatively associated with the enclosure; and
   (e) a floor of the enclosure connected to the one or more walls, said enclosure having a food supply apparatus and a water supply apparatus, said food supply apparatus having a food supply port in operative association with a food container accessible by the pet, said water supply apparatus having a water supply port in operative association with a water container accessible by the pet.

2. The grooming apparatus of claim 1, wherein the first grooming sheet and the second grooming sheet are a nonwoven material comprising fibers, selected from the group consisting of natural and synthetic, polymeric textile fibers.

3. The grooming apparatus of claim 2, wherein the first grooming sheet and the second grooming sheet comprise fibers selected from the group consisting of polyamide, polyester, polyolefin and acrylic polymer fibers.

4. The grooming apparatus of claim 2, wherein a sizing agent is applied to the first grooming sheet and the second grooming sheet and the sizing agent increases stiffness of the first grooming sheet and the second grooming sheet.

5. The grooming apparatus of claim 1, wherein the first grooming sheet and the second grooming sheet of the sheet to which the pressure sensitive adhesive has been applied has a loop tack force of from 5 to 60 grams per 25 mm×25 mm of surface area, as measured by ASTM D 6195-03.

6. The grooming apparatus of claim 1, wherein the pressure sensitive adhesive is selected from the group consisting of acrylic acid and acrylic ester polymers and copolymers.

7. The grooming apparatus of claim 1, wherein the one or more walls is a single wall and the enclosure is shaped like a tower.

8. The grooming apparatus of claim 1, further comprising a second opening.

9. The grooming apparatus of claim 1, wherein the one or more walls comprises at least three interlocking walls.

10. The grooming apparatus of claim 1, wherein the food container and the water container are removeably attached to the floor of the enclosure.

11. The grooming apparatus of claim 1, further comprising wherein the enclosure, the floor, the first replaceable groomer cartridge and the second replaceable groomer cartridge, the food supply apparatus, and the water supply apparatus all have snap-fit connectors, wherein the grooming apparatus is assembled without tools.

12. The grooming apparatus of claim 1, wherein the first grooming sheet and the second grooming sheet are treated with a composition for repelling or killing fleas, ticks, lice and mites.

13. The grooming apparatus of claim 12, wherein the composition for repelling or killing fleas, ticks, lice and mites is selected from the group consisting of oil of eucalyptus, lavender, rosemary, rose geranium, citronella, organophosphates, carbamates, pyrethrins, flea collar pesticide, and flea collar insecticide.

14. A grooming apparatus for a household pet, comprising:
(a) an enclosure having a floor, a transparent lid and a wall, with an opening in the wall, wherein the opening is positioned in the wall to be accessible to the pet and proportioned to allow the pet to pass back and forth from outside to inside the enclosure; and
(b) a first replaceable groomer cartridge having a first peripheral frame positioned in a first cartridge receiver in a first position, and the first replaceable groomer cartridge having an adhesive sheet disposed within the first peripheral frame and extending partially across the opening,
(c) a second replaceable groomer cartridge having a second peripheral frame positioned in a second cartridge receiver in a second position, and the second replaceable groomer cartridge having a grooming sheet disposed within the second peripheral frame and extending partially across the opening,
whereby the adhesive sheet and the grooming sheet are planar, are spaced from 4"-6" apart, and are each deflectable by the pet from a first deflectable position obstructing access through the opening to a second deflectable position deflected in the direction of movement of the pet through the opening, wherein the adhesive sheet and the grooming sheet are each sufficiently resilient to press against a torso of the pet in the second position while the pet passes through the opening, and wherein the adhesive sheet and the grooming sheet are each a textile material constructed from a plurality of fibers and each having a surface with a pressure sensitive adhesive applied thereto and contactable with the pet; and,
(d) the enclosure having a food supply apparatus and a water supply apparatus, said food supply apparatus having a food supply port in operative association with a food container accessible by the pet, said water supply apparatus having a water supply port in operative association with a water container accessible by the pet.

15. The grooming apparatus of claim 14, wherein the adhesive sheet and the grooming sheet are comprised of a plurality of triangular shaped flaps, with an apex of each flap oriented towards a center of the sheet.

16. The grooming apparatus of claim 14, wherein the food supply port and the water supply port are located in the lid, and the food supply port and the water supply port are connected to a chute for directing food or water to the food or water container accessible by the pet inside the enclosure.

17. The grooming apparatus of claim 14, wherein the surfaces of the adhesive sheet and the grooming sheet to which the pressure sensitive adhesive has been applied has a loop tack force of from 10 to 40 grams per 25 mm×25 mm of surface area, as measured by ASTM D 6195-03.

18. The grooming apparatus of claim 14, wherein the pressure sensitive adhesive is applied to two sides of the adhesive sheet.

19. The grooming apparatus of claim 18, further comprising a second adhesive sheet positioned in the opening, whereby the second adhesive sheet is deflectable by the pet from a third deflectable position obstructing access through the opening to a fourth deflectable position deflected in the direction of movement of the pet through the opening, wherein the second adhesive sheet is sufficiently resilient to press against a torso of the pet in the fourth position while the pet passes through the opening, and wherein another pressure sensitive adhesive is applied to two sides of the second adhesive sheet, and wherein the adhesive sheet and the second adhesive sheet are spaced apart at a distance of from 3 to 6 inches.

* * * * *